US011148787B2

(12) United States Patent
Goncalves et al.

(10) Patent No.: US 11,148,787 B2
(45) Date of Patent: Oct. 19, 2021

(54) AIRCRAFT PROPULSION SYSTEM COMPRISING A MEMBER COVERED WITH A GROOVED STRUCTURE

(71) Applicant: SAFRAN, Paris (FR)

(72) Inventors: Emilie Goncalves, Moissy-Cramayel (FR); Nicolas Pierre Lanfant, Moissy-Cramayel (FR); Robin Mandel, Moissy-Cramayel (FR)

(73) Assignee: SAFRAN, Paris (FR)

( * ) Notice: Subject to any disclaimer, the term of this patent is extended or adjusted under 35 U.S.C. 154(b) by 32 days.

(21) Appl. No.: 16/096,496

(22) PCT Filed: Apr. 24, 2017

(86) PCT No.: PCT/FR2017/050967
§ 371 (c)(1),
(2) Date: Oct. 25, 2018

(87) PCT Pub. No.: WO2017/187073
PCT Pub. Date: Nov. 2, 2017

(65) Prior Publication Data
US 2019/0152585 A1 May 23, 2019

(30) Foreign Application Priority Data
Apr. 26, 2016 (FR) ...................................... 1653679

(51) Int. Cl.
*B64C 23/00* (2006.01)
*F01D 25/02* (2006.01)
(Continued)

(52) U.S. Cl.
CPC ............ *B64C 23/005* (2013.01); *B64D 15/00* (2013.01); *B64D 15/12* (2013.01); *B64D 15/16* (2013.01);
(Continued)

(58) Field of Classification Search
CPC ...... B64C 23/005; B64D 15/00; B64D 15/12; B64D 15/16; B64D 15/163; B64D 15/20;
(Continued)

(56) References Cited

U.S. PATENT DOCUMENTS 4,732,351 A * 3/1988 Bird .................... B64D 15/163
244/134 D
5,172,024 A 12/1992 Broussoux et al.
(Continued)

FOREIGN PATENT DOCUMENTS

| FR | 2 667 256 A1 | 4/1992 |
| GB | 2472053 A | 1/2011 |
| WO | 2014/209665 A1 | 12/2014 |

OTHER PUBLICATIONS

International Search Report dated Jul. 14, 2017 from the International Bureau in International application No. PCT/FR2017/050967.
(Continued)

*Primary Examiner* — Courtney D Heinle
*Assistant Examiner* — Sang K Kim
(74) *Attorney, Agent, or Firm* — Sughrue Mion, PLLC

(57) ABSTRACT

The invention concerns an aircraft propulsion system comprising at least one member (1, 3, 4, 8) in contact with a turbulent flow of a stream (F), characterised in that said member is covered, at least partially, by a piezoelectric structure (S) such as a piezoelectric film, said structure (S) comprising a grooved structure (5, 6, 7, 9) comprising a series of grooves, in contact with the flow of the stream, the grooves extending in the direction of flow of the stream, the grooved structure comprising at least one geometric parameter (h, s, w) configured to adapt depending on at least one
(Continued)

parameter of the flow of the stream and/or an operating point of the propulsion system and/or an engine speed of the propulsion system.

11 Claims, 3 Drawing Sheets

(51) Int. Cl.
| | |
|---|---|
| *F01D 5/14* | (2006.01) |
| *F01D 9/02* | (2006.01) |
| *B64D 15/22* | (2006.01) |
| *B64D 15/16* | (2006.01) |
| *B64D 15/00* | (2006.01) |
| *B64D 15/20* | (2006.01) |
| *B64D 15/12* | (2006.01) |
| *F02C 7/047* | (2006.01) |
| *F02K 3/06* | (2006.01) |

(52) U.S. Cl.
CPC ........... *B64D 15/163* (2013.01); *B64D 15/20* (2013.01); *B64D 15/22* (2013.01); *F01D 5/141* (2013.01); *F01D 5/143* (2013.01); *F01D 9/02* (2013.01); *F01D 25/02* (2013.01); *F02C 7/047* (2013.01); *F02K 3/06* (2013.01); *F05D 2220/323* (2013.01); *F05D 2250/61* (2013.01); *F05D 2260/407* (2013.01); *Y02T 50/60* (2013.01)

(58) Field of Classification Search
CPC ......... B64D 15/22; F01D 5/141; F01D 5/143; F01D 9/02; F01D 25/02; F02C 7/047; F02K 3/06; F05D 2220/323; F05D 2250/61; F05D 2260/407

See application file for complete search history.

(56) References Cited

U.S. PATENT DOCUMENTS

| | | | |
|---|---|---|---|
| 9,708,929 B2* | 7/2017 | Szwedowicz | F02C 7/047 |
| 2013/0299637 A1* | 11/2013 | Hoffenberg | B64D 15/163 |
| | | | 244/134 A |
| 2019/0101002 A1* | 4/2019 | Duffin | F04D 29/384 |

OTHER PUBLICATIONS

Communication dated Apr. 26, 2016 from the French Patent Office in application No. 1653679.
Written Opinion, dated Jul. 14, 2017 from the International Bureau in counterpart International application No. PCT/FR2017/050967.
International Search Report of PCT/FR2017/050967 dated Jul. 14, 2017.

* cited by examiner

AIRCRAFT PROPULSION SYSTEM COMPRISING A MEMBER COVERED WITH A GROOVED STRUCTURE

CROSS REFERENCE TO RELATED APPLICATIONS

This application is a National Stage of International Application No. PCT/FR2017/050967 filed Apr. 24, 2017, claiming priority based on French Patent Application No. 1653679 filed Apr. 26, 2016, the entire contents of each of which are herein incorporated by reference in their entirety.

GENERAL TECHNICAL FIELD

The invention concerns a propulsion system comprising a member in contact with a turbulent flow of a stream and covered at least partially with a structure grooved in the direction of fluid flow (riblets).

STATE OF THE ART

A propulsion system typically consists of a nacelle and/or a turbine engine, such as a turbojet.

In connection with FIG. 1, an aircraft propulsion system (turbofan) generally comprises, from upstream to downstream in the direction of gas flow (along the engine axis AA), a ducted fan 1, an annular primary flow space I and an annular secondary flow space II (secondary duct). The primary flow I traverses the low-pressure compressor 8 and the high-pressure compressor 10, the combustion chamber 11 and the high- and low-pressure turbines 12. The secondary stream II bypasses the hot part; separation is achieved by the inner hub 3 located behind the ducted fan 1.

Inside the secondary duct are arranged outlet guide vanes (OGVs) 4 which straighten the flow of gases circulating therein in order to align it with the engine axis AA, the fan 1 producing a swirling flow.

To improve vane efficiency, the walls of the inner hub and outer housing, as well as the vane walls, can be grooved in the flow direction of the fluid.

These grooves can have several shapes. The shape, flow alignment, size and especially the spacing of these grooves directly influence the flow and the expected gain in performance of the turbojet engine. A problem is that the grooves will be heavily subjected to erosion but also to fouling.

In addition, during in-flight operation of a turbojet engine, a layer of ice or frost may form on the wings, the engine air intakes or the airflow sensors.

The presence of ice is a threat to aircraft safety and performance.

In-flight icing occurs most often during the landing phase, under certain climatic conditions between 3000 m and 6000 m. The aircraft may then be subjected to the impact of ice crystals and/or supercooled water drops (liquid water with a temperature below 0° C.). These droplets, ranging in size from 0 to 500 μm, strike the cold surface of the aircraft causing the dangerous accumulation of ice.

The consequences of icing on an engine can be numerous: obstructions of air intakes leading to power loss, ingestion of ice, icing on the vanes and rotor leading to reduced autorotative capacity or even stalling or to over-consumption of fuel.

In addition, the presence of ice leads to a change in the aerodynamic profile and therefore a dangerous reduction in lift.

In order to limit the presence of ice, known solutions consist in covering parts of the propulsion system that may be exposed to ice with an icephobic coating (see document EP 2 431 276) that can be subjected to vibrations to facilitate detachment of the ice (see document FR 2 998 921).

These solutions, which do not necessarily limit ice formation and in which vibration is complex to implement, are not compatible with the grooves used to improve aerodynamic performance. Indeed, two distinct solutions must be provided.

PRESENTATION OF THE INVENTION

One goal of the invention is to improve the aerodynamic performance of an aircraft by using grooves while limiting the formation of ice on components of a propulsion system.

To that end, the invention proposes an aircraft propulsion system comprising at least one member in contact with a turbulent flow of a stream, characterized in that said member is covered, at least partially, with a piezoelectric structure such as a piezoelectric film, said structure comprising a grooved structure comprising a series of grooves, in contact with the flow of the stream, the grooves extending in the flow direction of the stream, the grooved structure comprising at least one geometric parameter configured to adapt as a function of at least one parameter of the stream flow and/or an operating point of the propulsion system and/or an engine speed of the propulsion system.

The invention is advantageously supplemented by the following features, taken alone or in any one of their technically possible combinations:
- the grooved structure consists of a piezoelectric film;
- the piezoelectric film is of the electroactive polymer type selected from the following group: PVDF, PVF2, PVF2-TFE, PMMA or a PZT ceramic;
- the structure further comprises a unit for polarizing the film by means of an alternating voltage source and conductive or semiconductive electrodes placed in contact with the film;
- the height of the grooves is comprised between 10 μm and 100 μm;
- an operating point of the propulsion system is: parking, shop-visit, cruise, icing episode.

The invention also concerns an aircraft comprising a propulsion system according to the invention. More precisely, the invention concerns an aircraft comprising an element exposed to air flow.

PRESENTATION OF THE FIGURES

Other features, aims and advantages of the invention will emerge from the following description, which is purely illustrative and non-limiting, and which must be read in connection with the appended drawings wherein.

On all figures, similar elements have the same reference numerals.

DETAILED DESCRIPTION OF THE INVENTION

Figure 1:
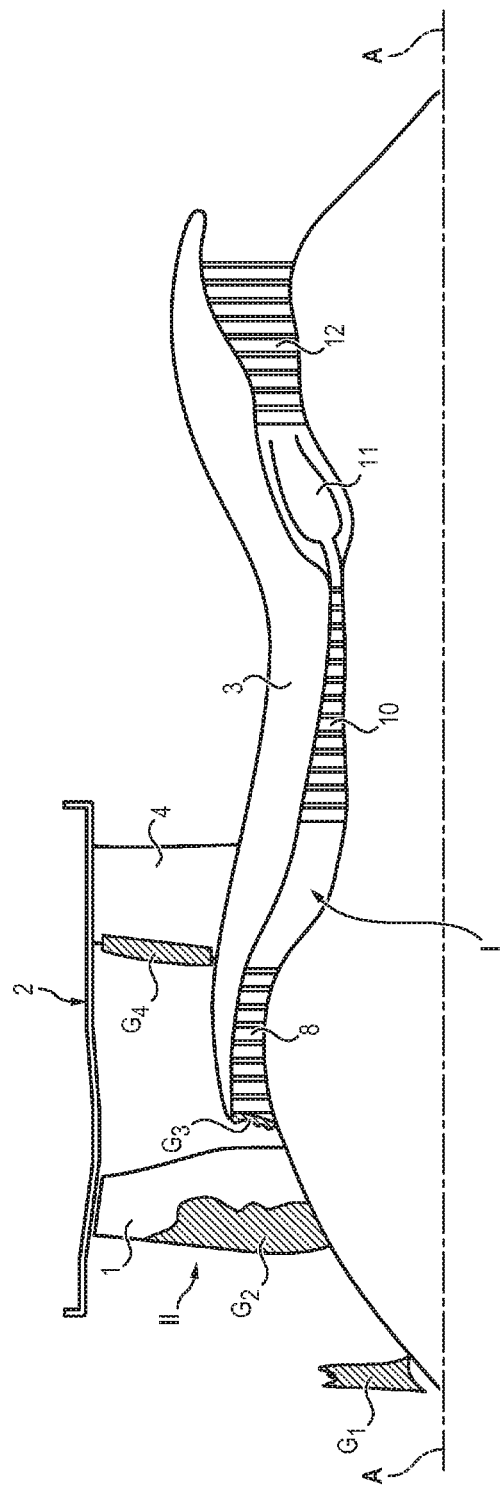
FIG. 1 illustrates an overview of an aircraft propulsion system.
Figure 2:
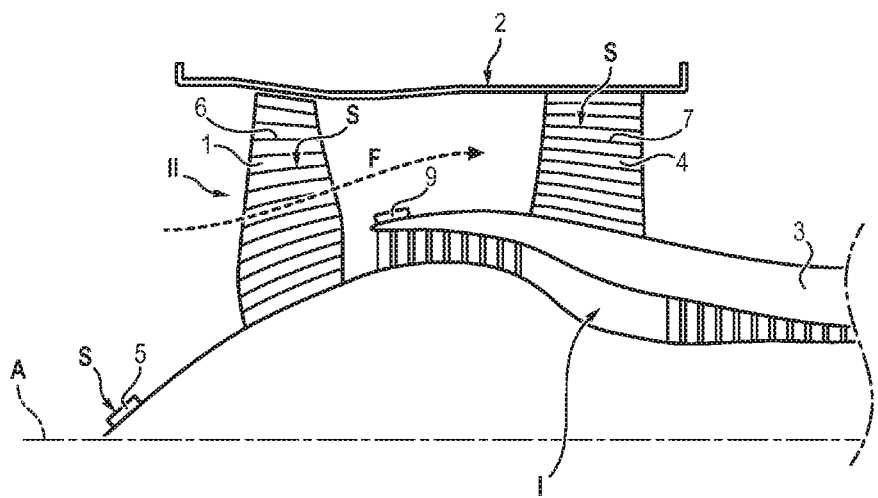
FIG. 2 illustrates a detailed view of FIG. 1.

FIG. 2 illustrates a detailed view of FIG. 1 comprising an assembly for circulating a flow of a stream wherein, one or more members may be covered at least partially with a structure of a structure S comprising a grooved structure 5, 6, 7 comprising a series of grooves, in contact with the flow of the stream, the grooves extending longitudinally in the flow direction of the stream.

The grooved structure 5, 6, 7 is preferably arranged on the ducted fan 1 (reference numeral 5) and/or on the outer wall of the inner hub (reference numeral 6) and/or on the outlet guide vane (reference numeral 7).

Figure 3:
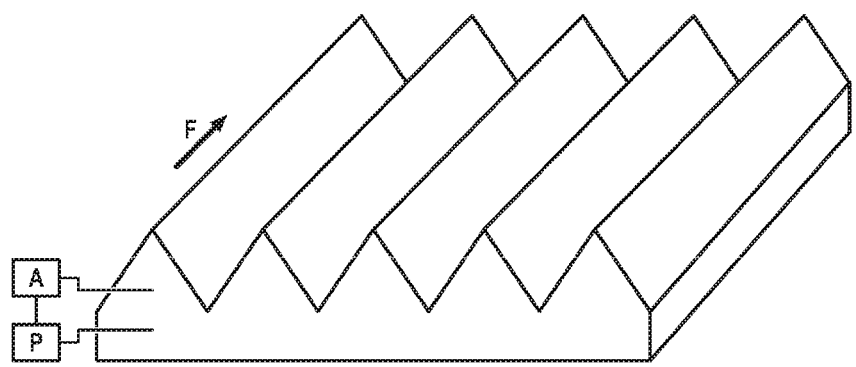
FIG. 3 illustrates a piezoelectric structure according to the invention.

FIG. 3 illustrates a structure S comprising a grooved structure traversed by a flow of a stream (arrow in FIG. 3).

Figure 4A:
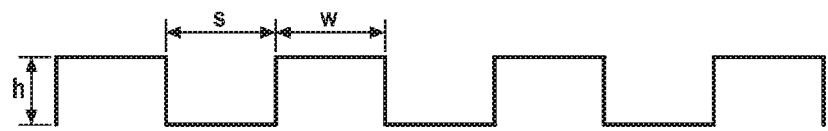
FIGS. 4a to 4d illustrate examples of grooves.
Figure 4B:
Figure 4C:
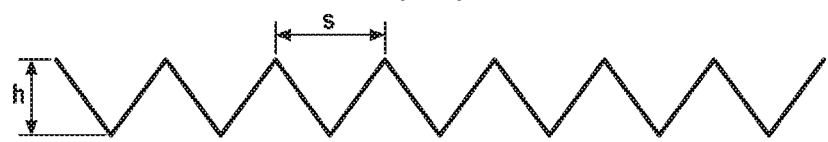
Figure 4D:

The grooves can take several shapes: crenel (FIG. 4a), parabolic (FIG. 4b), triangular (FIG. 4c), trapezoidal (FIG. 4d).

In the case of parabolic grooves, it is the concave part that is in contact with the stream.

In the case of trapezoidal grooves, the small base is in contact with the channel wall while the large base of the trapezoid is removed.

The grooved structure may advantageously consist of grooves of different shapes.

In particular, the grooved structure is configured to adapt as a function of at least one parameter of the stream flow and/or an operating point of the propulsion system and/or an engine speed of the propulsion system.

The structure can thus retract to allow a detachment of ice (anti-icing system). In addition, it limits fouling of the grooves to increase the duration of the initial gain (examples: ease of ground cleaning, in-flight cleaning under the effect of the stream in contact with the structure).

A geometric parameter is, depending on the shape of the groove: the height h, the spacing s between two vertices, the intermediate width w in the case of crenels (see FIG. 4a).

A flow parameter is flow pressure, flow temperature, flow velocity, flow direction.

The grooved structure preferably consists of a film of PZT ceramic or of electroactive polymer that allows groove depth to be modulated according to an operating point and/or engine speed. An electroactive polymer is a polymer whose shape and size change when stimulated by an electric field. The magnitude of the deformation will be a function of the electrical pulse sent. Thus, magnitude of the roughness will be a function of the pulse sent.

To adjust the grooves, the structure S comprises a polarization unit P with an alternating voltage source and conductive or semiconductive electrodes placed in contact with the film. The polarization unit P is optionally coupled to an acquisition unit A configured to acquire flow parameters of the stream.

The amplitude of the vibration sent by the voltage source will deform the film longitudinally and/or transversely. The magnitude of the deformation will be a function of the power sent, thus giving the desired groove depth or roughness.

Thus, depending on the aerodynamic flow to which the wet surface is subjected, it is possible to adjust the shape and depth of the grooves of the structure to obtain the minimum drag and, consequently, the best performance of the propulsion system. The grooves are very sensitive to erosion (sand, rain, etc). Erosion damages their structure (for example, the vertex of the peak for a triangular shape) leading to a loss of efficiency (thickness of the laminar flow layer, meaning the ability to move the turbulent flow layer away, regularity of the vortices between two adjacent grooves, etc.) and therefore a loss of aerodynamic performance.

The efficiency of the grooves is thus dependent on their shape and so it is necessary to use materials that can tolerate different sources of damage.

The use of a piezoelectric film reduces the effect of erosion since the shape of the grooves can be adjusted at certain engine cycles where the gain is particularly high and not systematically over the entire flight time.

In addition, the grooves are also very sensitive to fouling. Indeed, they can have V-shaped hollows with sharp angles that can quickly fill with dust, ice or grease. This is particularly true in the engine environment.

The use of a piezoelectric film thus allows the grooves to be put in a "parking" and "shop-visit" flight phase in order to facilitate surface cleaning by water jet for example. The grooves could also be retracted during a "cruise" flight phase in order to let the power of the airstream carry away all or part of the deposits.

The grooves can have a depth h comprised between 1 µm and 50 µm depending on the geometry of the treated surface and the desired aerodynamic performance. For triangular shapes, the angle varies between 15 and 60° and for all shapes (crenel, triangular, U-shaped groove), the peak to peak height varies from 20 to 100 µm with a peak height comprised between 10 and 100 µm.

Advantageously, to prevent ice formation or to allow ice to detach, the grooves can be dimensioned so that the structure S has a roughness comprised between 1 and 2.2 µm. In this case, the grooves will be suitably dimensioned during an icing episode.

Indeed, during the flight phase, ice can be deposited at various locations: on the air intakes (G1, G2), and/or on the ducted fan 1 (G3) and/or on the outlet guide vanes 4 (G4) (see FIGS. 1 and 2).

The electroactive film must therefore have erosion resistance properties but also hydrophobic properties to improve resistance to adhesion of ice on contact.

Also, it is preferably a hydrophobic PVDF or $PVF_2$, $PVF_2$-TFE, PMMA type polymer, all with hydrophobic properties or on a PZT (lead zirconate titanate) ceramic of chemical formula $Pb(Zr_x, Ti_{1-x})O_3$ in the form of a thin film or polymerized gel. Several compositions are possible by varying the Zr/Ti ratio.

The grooved structure is advantageously obtained by grooving a wall of the member subjected to turbulent flow. The grooves can be obtained by surface texturing metal or polymer or ceramic with a laser or by depositing metal layers or by using a mask to print the pattern on the polymer or ceramic.

The invention claimed is:

1. An aircraft propulsion system comprising:
   at least one member in contact with a turbulent flow of a stream, wherein the at least one member is covered, at least partially, with a piezoelectric film comprising a grooved structure comprising a series of grooves, in contact with the flow of the stream, the grooves being formed by grooving a surface of the at least one member such that the grooves have a vertex that extends continuously in a flow direction of the stream in order to form longitudinal channels for the stream, the grooved structure comprising at least one geometric parameter configured to adapt as a function of at least one parameter of the stream flow and/or an operating point of the aircraft propulsion system and/or an engine speed of the aircraft propulsion system, the at least one geometric parameter being a height and a spacing between two vertices.

2. The aircraft propulsion system according to claim 1, wherein the piezoelectric film is of the electroactive polymer type selected from a group consisting of PVDF, PVF2, PVF2-TFE, PMMA and a PZT ceramic.

3. The aircraft propulsion system according to claim 1, wherein the structure further comprises a polarizing unit that polarizes the film by an alternating voltage source and conductive or semiconductive electrodes placed in contact with the film.

4. The aircraft propulsion system according to claim 1, wherein the height is between 10 μm and 100 μm.

5. The aircraft propulsion system according to claim 1, wherein the operating point of the aircraft propulsion system is: parking, shop-visit, cruise, or icing episode.

6. An aircraft comprising the aircraft propulsion system according to claim 1.

7. The aircraft propulsion system according to claim 1, wherein the grooves are longitudinal grooves.

8. The aircraft propulsion system according to claim 1, wherein the piezoelectric film is selected from the following group: PVDF, PVF2, PVF2-TFE, PMMA or a PZT ceramic.

9. The aircraft propulsion system according to claim 1, wherein each groove is formed of two walls that extend longitudinally in the flow direction with the vertex therebetween, and an angle between the two walls of the groove is between 15 degrees and 60 degrees.

10. The aircraft propulsion system according to claim 1, wherein a peak to peak height of the grooves in a transverse direction to the flow direction is between 20 μm and 100 μm, and a peak height of the grooves in a direction orthogonal to the flow direction is between 10 μm and 100 μm.

11. The aircraft propulsion system according to claim 1, wherein each groove is formed of two walls that extend longitudinally in the flow direction with the vertex therebetween, a peak to peak height of the grooves is between 20 μm and 100 μm, a peak height of the grooves is between 10 μm and 100 μm, and an angle between the two walls of the grooves is between 15 degrees and 60 degrees.

* * * * *